United States Patent [19]

Takigawa et al.

[11] Patent Number: 5,001,841
[45] Date of Patent: Mar. 26, 1991

[54] APPARATUS FOR INSPECTING A PROFILE OF A ROD

[75] Inventors: Toshimichi Takigawa; Shigeo Iida; Kazuo Murakami; Shigero Masamori; Kazuharu Yabushita, all of Kobe, Japan

[73] Assignee: Mitsubishi Jukogyo, K.K., Tokyo, Japan

[21] Appl. No.: 517,412

[22] Filed: Apr. 30, 1990

Related U.S. Application Data

[63] Continuation of Ser. No. 374,618, Jun. 29, 1989, abandoned, which is a continuation of Ser. No. 96,972, Sep. 14, 1987, abandoned.

[30] Foreign Application Priority Data

Sep. 22, 1986 [JP] Japan .................... 61-224008
Oct. 29, 1986 [JP] Japan .................... 61-258021

[51] Int. Cl.$^5$ ................................ G01B 7/28
[52] U.S. Cl. ..................................... 33/551
[58] Field of Search ...................... 33/551-556, 33/502, 503, 542, 543

[56] References Cited

U.S. PATENT DOCUMENTS

| | | |
|---|---|---|
| 3,259,989 | 7/1966 | Wilson . |
| 3,443,317 | 5/1969 | Grahmann ............... 33/502 |
| 4,048,009 | 9/1977 | Weilbacher . |
| 4,290,303 | 9/1981 | Harman et al. ............ 33/551 X |
| 4,329,049 | 4/1982 | Blose .................... 33/551 X |
| 4,413,637 | 11/1983 | Irving . |

FOREIGN PATENT DOCUMENTS

| | | |
|---|---|---|
| 1462603 | 11/1966 | France . |
| 123547 | 11/1975 | German Democratic Rep. . |
| 220389 | 3/1985 | German Democratic Rep. . |
| 56-137202 | 10/1981 | Japan . |

Primary Examiner—Harry N. Haroian
Attorney, Agent, or Firm—Stanger, Michaelson, Spivak & Wallace

[57] ABSTRACT

An apparatus which inspects a profile of each rod of a bundle of rods assembled in a cluster includes a holding device for holding a rod, a profile detection sensor for detecting the profile of the rod, a reference position setting device for setting a reference position of the rod, a position detection device for detecting an inspection position of the rod with respect to the reference position and a signal processing and display device for processing and displaying signals from the profile detection sensor and the position detection device. Particularly, the profile detection sensor includes a cylindrical shell into which the rod is inserted, a single or a plurality of strain gauge type sensors disposed in the shell and brought into contact with an external surface of the rod to detect the profile of the rod, a drive motor and a mechanism thereof for rotating the shell about the rod and a drive motor and a mechanism thereof for slidably moving the shell in the longitudinal direction of the rod.

4 Claims, 7 Drawing Sheets

APPARATUS FOR INSPECTING A PROFILE OF A ROD

This is a continuation of application Ser. No. 374,618, filed June 29, 1989, now abandoned which is a continuation of Ser. No. 096,972 filed Sept. 14, 1987, now abandoned.

This invention relates to an apparatus for inspecting the profile of a rod and more particularly to an apparatus for inspecting the profile of each rod in a cluster of control rods such as used in a pressurized water reactor.

In the pressurized water reactor, for example, which is recently used in most power reactors, control rods are used to control the in-pile nuclear reaction and the neutron flux distribution. The control rods are formed of a plurality of elongated neutron absorber rods combined integrally through an upper spider which are independently inserted in and pulled out from a long guide pipe in collected nuclear fuel, and are named a control rod cluster.

The control rod is used as described above and is thus worn away by contact with the guide pipe and the other guide support. It is confirmed that the wear is not negligible.

Accordingly, the external appearance of the control rod is inspected when the fuel of the nuclear reactor is exchanged. The control rod worn largely is removed.

More particularly, since the control rods used in the nuclear reactor are radiated and produce intensive radiation, an inspector can not approach the control rods directly. Accordingly, the control rods have been held in the water and the external appearance of the rods has been inspected by an underwater television camera. The wear amount of the control rod is not measured quantitatively and it has been judged whether the control rod can be further used or not by experience and perception of the inspector on the basis of the external appearance of the control rod.

However, if the quantitative measurement of the wear amount can be made, whether the control rod can be further used or not can be judged with accuracy. Accordingly, various trials and propositions have been made.

For example, Japanese patent application No. 293976/85 filed by the applicant of the present invention discloses a wear sensor utilizing a differential transformer having a movable magnetic core.

In the sensor, the movable magnetic core is pressed to a body to be inspected using a spring. Displacement of the magnetic core varied in accordance with a shape of the external surface of the body is detected as a voltage so that inspection of the control rod is made on the basis of the voltage.

The apparatus of the above-referenced patent application includes a cylindrical shell which receives the control rod. The shell is provided with a strain gauge type sensor which is pressed on the external surface of the control rod. The shell is rotated about the control rod to detect deformation, that is, the wear amount of the external surface of the control rod on the basis of an output of the sensor.

The prior art inspection apparatus using the underwater television camera as described above can not measure the wear amount quantitatively or can not inspect the external appearance of the control rod existing in a dead angle of the camera caused by the cluster structure of the control rods.

Further, utilization of the differential transformer in the inspection apparatus used in the water deteriorates measurement accuracy as well as practical use.

OBJECT AND SUMMARY OF THE INVENTION

It is an object of the present invention to provide a profile inspection apparatus of a rod which quantitatively measures a wear amount on an external surface of the rod such as a control rod with accuracy to inspect the profile of the rod and continuously inspects a sectional shape of the worn rod.

In order to achieve the above object, the apparatus of the present invention is structured as follows.

According to the present invention, there are provided a profile detection sensor into which a rod to be inspected is inserted, a holding member which holds the rod and moves the rod in an axial direction thereof if necessary, a reference member indicative of an inspection reference position in the axial direction of the rod and a remote visual device for detecting the reference position.

The profile detection sensor includes a cylindrical shell which receives rods which are typically rod having a cylindrical section smoothly without gap. A single or a plurality of strain gauge type sensors of leaf spring type are disposed in the cylindrical shell and provided with contact projections. A floating tip of the sensor is brought into contact with the external surface of the rod and is lengthened or shortened in response to the external surface of the rod. The sensor transforms in response to the displacement of the contact projection to produce an output signal in accordance with unevenness of the external surface of the rod.

The number of the strain gauge type sensors may be single or plural, while a plurality of sensors are disposed at intervals of equal angles. When the cylindrical shell rotates about the rod, the sensors produce signals in response to the sectional profile of the rod and supply the signals to a central processing unit and a display unit. The sectional profile is operated and displayed as numerical values or a figure.

Further, the contact makers of the plurality of sensors are shifted in the axial direction of the rod at regular intervals so that the sensors produce signals in accordance with the sectional profile at each point in the longitudinal direction of the rod and supply the signals to the central processing unit and the display unit to operate and display the numerical values or the figure of the profile when the shell rotates about the rod.

The display unit may be a CRT display, a printer or a plotter.

In order to measure the sectional profile at plural positions in the longitudinal direction of the rod, a drive unit which slidably moves in the longitudinal direction of the rod is constructed together with the cylindrical shell and its rotary drive unit if necessary.

As described above, according to the present invention, the wear amount of the rods formed into a cluster can be measured quantitatively. Since the rods to be inspected are clamped and uneveness of the external surface of the rods is detected by the strain gauge type sensor of leaf spring type, the reliability of the quantitatively measured data is extremely high.

Since the shell of the detection sensor into which the control rods are inserted is provided with the strain detection sensors disposed in the circumferential direction and the axial direction of the shell at predetermined intervals and is rotated, the axial profile and the sectional profile of the many control rods at any position thereof can be inspected quantitatively and rapidly.

Further, the remote visual device can be used to inspect the external appearance of the rods qualitatively as usual, and hence inspection of the portion of the rod which is not worn can be omitted to quickly judge whether the rod is used or not on the basis of the wear amount.

DETAILED DESCRIPTION OF PREFERRED EMBODIMENTS

First Embodiment

Figure 1:
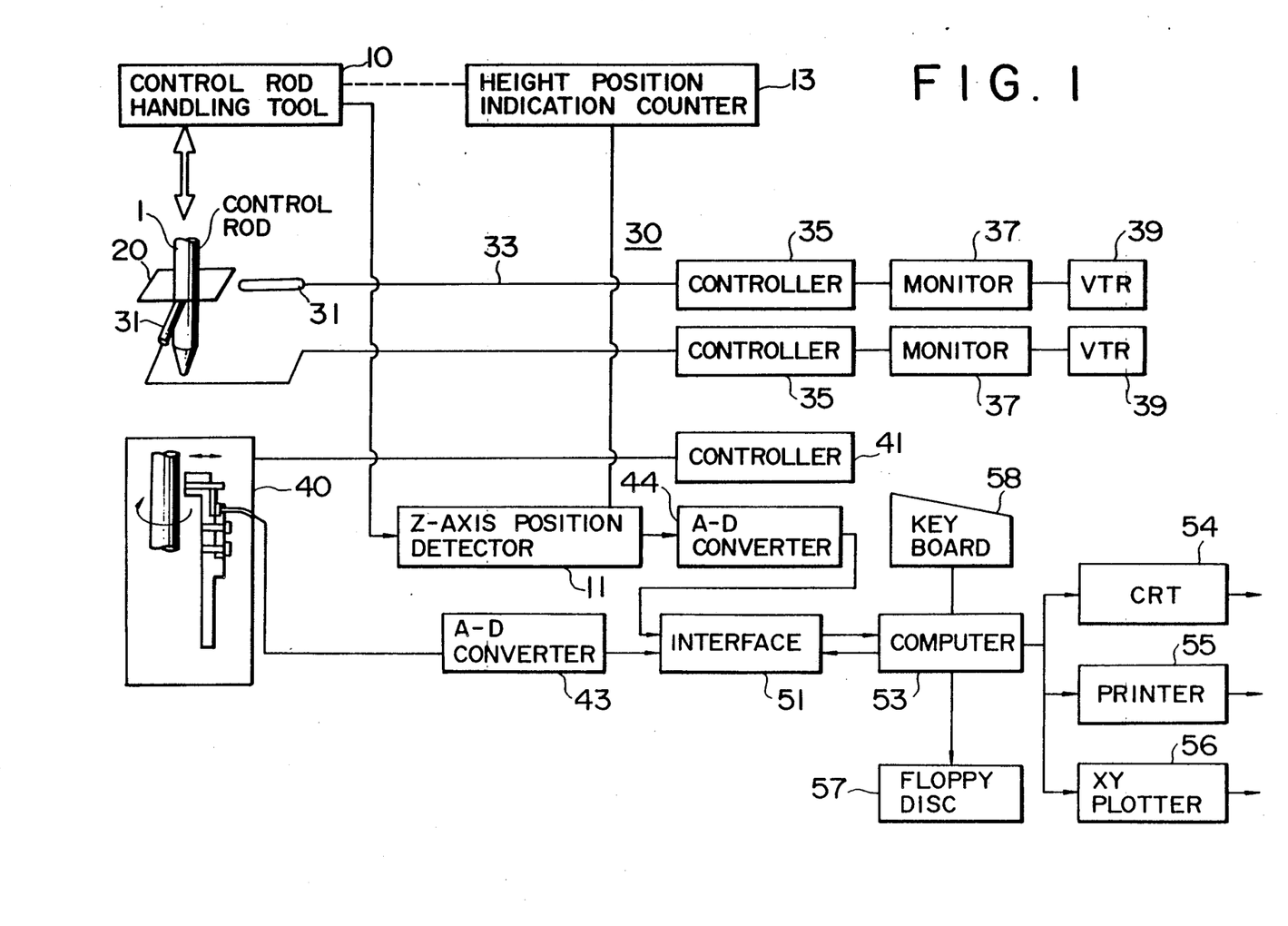
FIG. 1 is a whole system diagram of first and second embodiments according to the present invention.

FIG. 1 is a system diagram showing the overall configuration of an embodiment in which the present invention serves for inspection of the wear of the control rod of a nuclear reactor.

The actual structure of details is described with reference to FIGS. 2 to 4. A control rod 1 is held by a control rod handling tool 10 and kept in the water. The rod 1 is further moved up and down by the handling tool 10. A reference member, that is, a piano wire 20 is stretched in the same horizontal plane in the water in the direction intersecting the control rod 1. Two underwater television cameras 31 disposed at the level of the piano wire are connected through connecting cables 33 to controllers 35 disposed outside the water and further connected through monitor television receivers 37 to video tape recorders (VTR) 39, respectively. The underwater television cameras 31, controllers 35, monitor television receivers 37 and video tape recorders 39 form a remote visual device 30 as a whole.

The controller 35 adjusts the focus and the picture quality of the underwater television camera 31. An image taken by the camera 31 is displayed on the television receiver 37. The control rod 1 is moved up and down by the control rod handling tool 10 so that the piano wire 20 is aligned with the reference position of the control rod 1 on the screen of the television receiver 37. When the piano wire 20 is aligned with the reference position of the rod 1, a reading of an encoder (not shown) provided in the handling tool 10 is set to zero. Output signals of the encoder are taken out by a Z-axis position detector 11 to be supplied to an interface 51. A Z-axis height position, the control rod number, a date and the like may be displayed in the television receiver 37 if necessary and be recorded together with the image.

A profile detection sensor 40 described later is held in a predetermined position with respect to the piano wire 20 and the underwater television cameras 31. The angular movement of the sensor is controlled by a controller 41. An output signal of the sensor 40 is converted into a digital signal in an A-D converter 43 and is supplied to a computer 53 through the interface 51 together with the Z-axis position signal. A keyboard 58 and a floppy disc 57 are connected to the computer 53. An output of the computer 53 is supplied to a proper display unit, that is, one or two of a CRT display 54, a printer 55 and an XY plotter 56.

A height position indication counter 13 is disposed near a control panel of the control rod handling tool 10 and indicates the Z-axis position to an operator.

Figure 2:
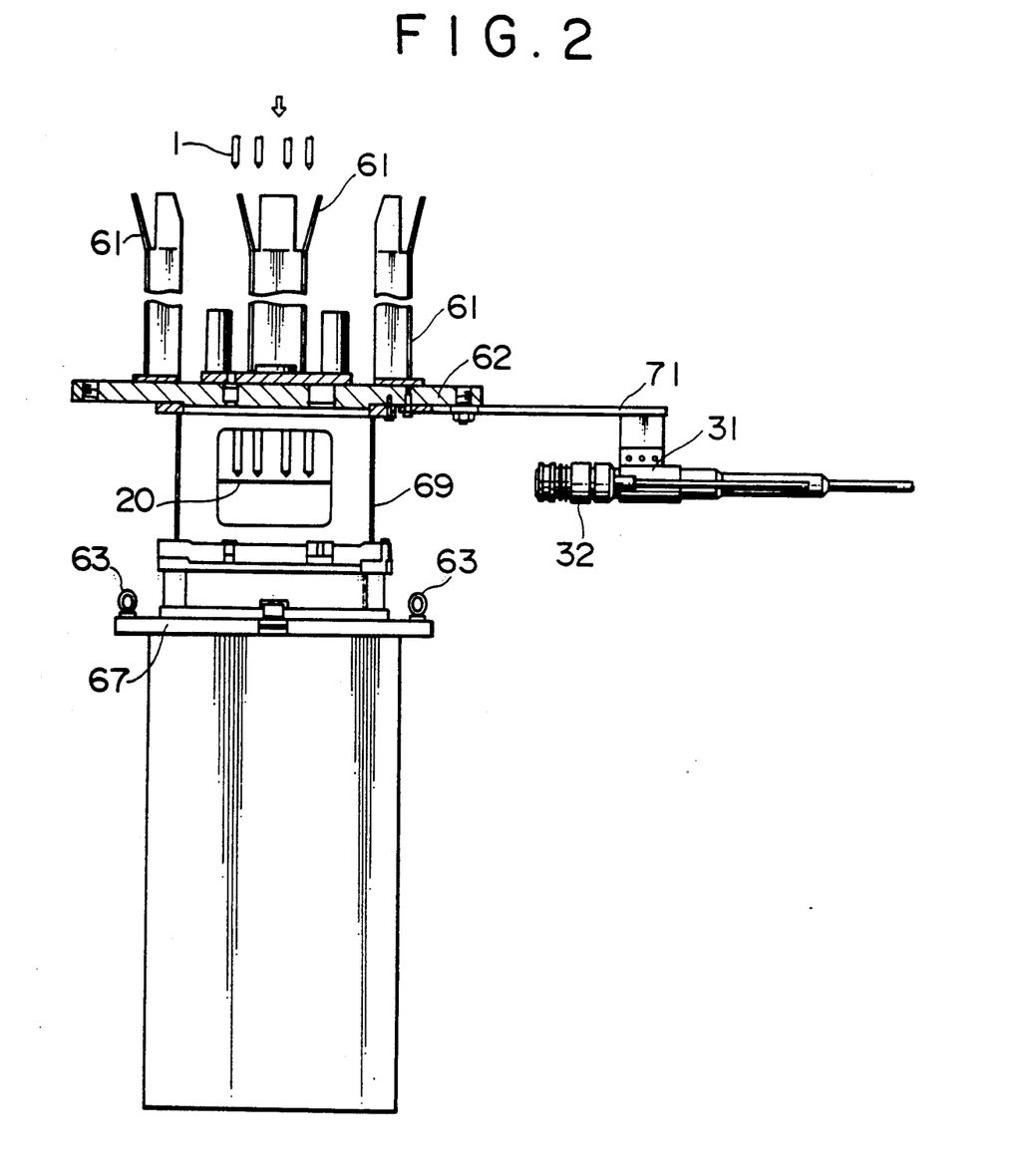
FIG. 2 is a longitudinal sectional view illustrating a main part of the first embodiment.
Figure 3:
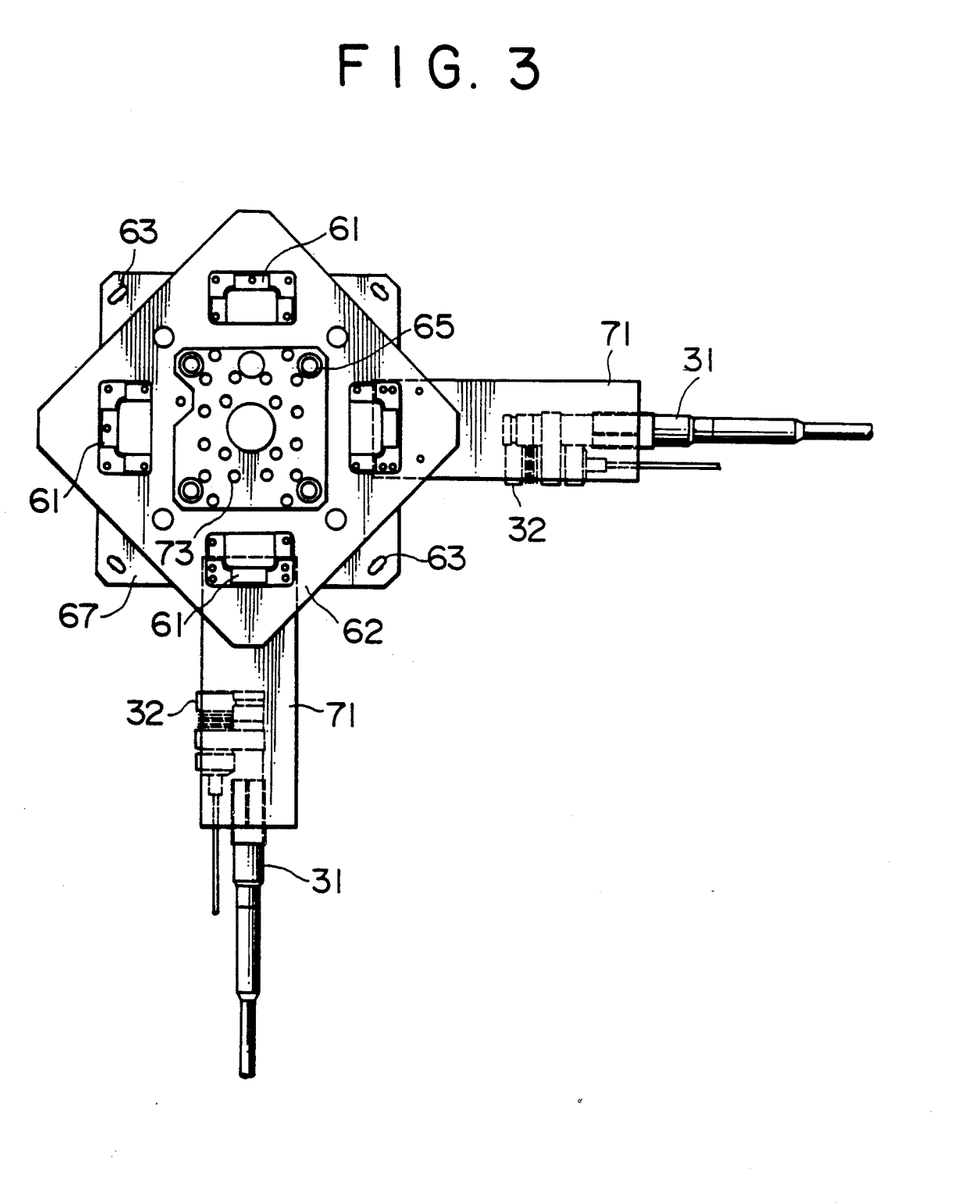
FIG. 3 is a plan view of the main part of the first embodiment.

The structure of the measurement portion of the profile inspection apparatus appears in FIG. 2 (elevational view) and FIG. 3 (plan view).

A camera box 69 with a window in which the piano wire 20 is stretched horizontally is mounted on and depends from the lower surface of a lifting plate 62 on which guide frames 61 fixedly stand. The measuring portion is usually set in a pit filled with water. In this case, lifting wires of a crane are connected with eyebolts 63 described later.

The guide frames 61 serve as guide members for setting the control rods (cluster). Guide poles 65 disposed near the center of the lifting plate 62 serve for final positioning.

A base plate 67 is to place on a stand not shown (which may be a rack disposed in a pit for storing used nuclear fuel) and is connected to the lifting plate 62 through the camera box 69.

The two underwater television cameras 31 mounted to the lifting plate 62 through a bracket 71 face the piano wire 20 stretched in the window of the box 69 so that the cameras 31 can make an image of both the piano wire 20 and the control rods 1 when the control rods 1 in the form of cluster are inserted into the box 69. An illuminating lamp 32 is provided beside the camera 31.

The profile detection sensor 40 is disposed corresponding to holes 73 of the lifting plate 62 into which the control rods 1 are inserted. Detail thereof is described with reference to FIG. 4.

Figure 4:
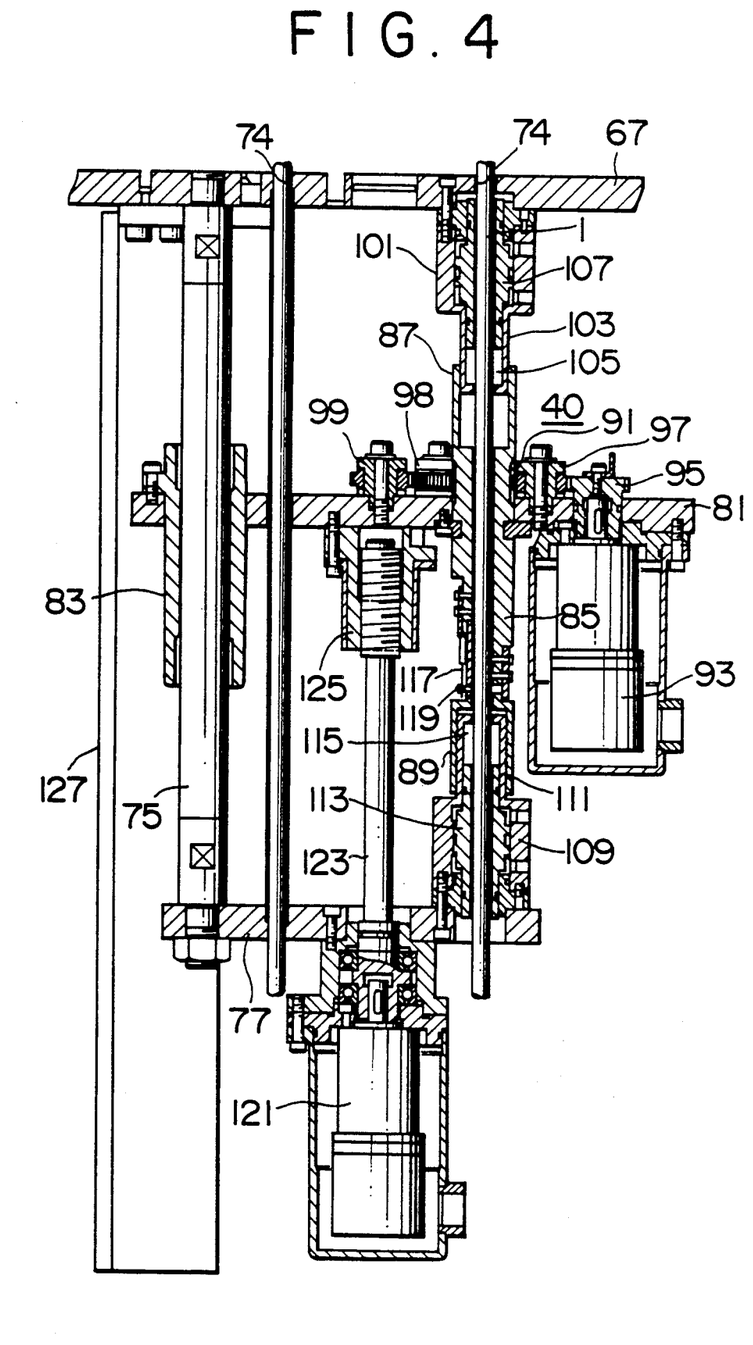
FIG. 4 is a partially enlarged view of FIG. 2.

In FIG. 4, a support plate 77 is mounted under and parallel to the base plate 67 through a guide bar 75.

In FIG. 4, a guide sleeve 83 fixed to a movable support plate 81 of the profile detection sensor 40 is fitted to the guide bar 75 slidably.

A shell 85 which is rotatably fitted to the movable support plate 81 includes cylinders 87 and 89 disposed at the upper and lower portions thereof and a gear 91 is formed on the external surface of the central portion of the shell 85. A gear 95 fitted onto an output shaft of the movable drive unit, that is, a stepping motor 93 is meshed with the gear 91 of the shell 85 through a gear 97. Thus, when the stepping motor 93 is operated, the shell 85 is rotated about the control rod 1.

An upper cylinder 101 fixed to the base plate 67 in alignment with the shell 85 includes a clamp rubber 105 in an end sleeve 103. Further, the end sleeve 103 pits rotatably and slidably in the cylinder 87 of the shell.

A piston 107 of the upper cylinder 101 is moved up and down (in the figure) by pressurized fluid. When the piston 107 is moved down, the piston 107 compresses the clamp rubber 105 axially to expand the clamp rubber 105 radially so that the clamp rubber 105 holds the inserted control rod 1.

Similarly, an end sleeve 111 of the lower cylinder 109 fixed to the support plate 77 in alignment with the shell 85 is slidably moved in the cylinder 89 of the shell 85 and supports the cylinder 89 rotatably. A piston 113 in the lower cylinder 109 is moved up (in the figure) to expand a clamp rubber 115 so that the clamp rubber 115 fixedly holds the control rod 1.

Holes corresponding to holes 74 in the base plate 67 are formed in the support plate 77 and the movable support plate 81 through the upper cylinder 101, the shell 85, the lower cylinder 109 and the like and various control rods 1 to be inspected are inserted in the holes.

A strain gauge type sensor 117 of leaf spring type fixed to the external surface of the shell 85 by a screw includes a projection 119 formed at its tip. The spring force of the leaf spring sensor brings the projection 119 into contact with the external surface of the control rod.

In order to cause the strain gauge type sensor 117 to follow the unevenness of the external surface of the control rod 1 exactly, a support member may be mounted at the opposite side of the sensor 117. The sensor 117 includes a Wheatstone bridge circuit assembled therein and which detects deformation of the strain gauge type sensor 117 as variation of a voltage to produce an output signal.

A plurality of shells 85 may be provided within the limits of the space allowed. Gears 98 and 99 rotate another shell not shown. A rotatable angle of the shell is at least 360 degrees for the single sensor 117, and when a plurality of sensors 117 are provided at intervals of equal angle, the rotatable angles of each shell may be small correspondingly.

A stepping motor 121 for up-and-down movement which is fixed to a lower surface of the support plate 77 includes an output shaft coupled with a fixed screw 125 through a vertically movable screw 123.

The fixed screw 125 is fixedly mounted to a lower surface of the movable support plate 81, and the movable support plate 81, the shell 85 and the strain gauge type sensor 117 can be moved up and down within the limited stroke in response to the rotation of the stepping motor 121.

A guide plate 127 is fixedly hung to a lower surface of the outer periphery of the base plate 67.

The deformation detection output signal of the strain gauge type sensor 117 is supplied to the A-D converter 43. A controller 41 controls the stepping motors 93 and 121 and drive of the pistons 107 and 113.

The structure and function of the embodiment have been described individually. The following describes inspection of the profile of the control rod 1 using the profile inspection apparatus in succession.

At first, a device such as a crane is used to hang up the measuring portion through the eyebolts 63 and the measuring portion is set on a predetermined base, for example a storage rack (not shown) in a pit for the used nuclear fuel. The guide plate 127 guides this setting and protects the profile detection sensor 40 against collision and interference during movement.

Then, the control rods 1 to be inspected are hung and moved by the control rod handling tool 10. When the control rods 1 are moved just above the measuring portion, the control rods 1 are lowered slowly. Since the outside shape of the control rods 1 is determined previously, the control rods 1 are guided to the guide frame 61 as the rods are lowered and each tip of the control rods 1 is inserted into the hole 73 of the lifting plate 62.

When the control rod 1 is further lowered, the tip of the control rod 1 reaches the same height as the piano wire 20. This position is detected by the underwater television camera 31 and is set as the reference position. At this time, a reading of the Z-axis position detector 11 is adjusted to zero point. If any mark is formed on the external surface of the control rod 1 as the reference position, coincidence of the mark and the piano wire 20 may be detected instead of the tip of the control rod 1. If a clear picture is not obtained in the monitor television receiver 37, the controller 35 is used to make the adjustment described above.

The distance between the strain gauge type sensor 117 of the detection sensor 40 and the piano wire 20 is determined previously. Accordingly, when the control rod 1 is lowered by the distance, the tip of the control rod 1 comes to the position of the sensor 117.

The external surface of the control rod 1 is first observed by the underwater television camera 31 over the whole length of the control rod 1. Thus, a part of the external surface of the control rod which is worn can be detected and the distance between the part and the reference position can be determined.

Then, the control rod 1 is moved up and down so that the part to be quantitatively measured is set to the position of the projection 119 of the strain gauge type sensor 117. After completion of setting, the pistons 107 and 113 are moved to compress the clamp rubbers 105 and 115 in the longitudinal direction and expand the clamp rubbers 105 and 115 radially so that the control rod 1 is fixed by the clamp rubbers.

When the control rod 1 can not be positioned in the longitudinal direction exactly, the control rod 1 is fixed near the exact position by the clamp rubbers 105, 115 and the stepping motor 121 is then used to finely adjust the vertical position of the shell 85.

After completion of the exact positioning (in the longitudinal direction), the stepping motor 93 is operated to rotate the shell 85 and hence the strain gauge type sensor 117 about the control rod 1.

The strain gauge type sensor 117 follows a concavity on the external surface of the control rod 1 formed by the wear and transforms the shape of the concavity to an electrical value to produce a detected output signal which is supplied to the A-D converter 43. At the same time, the Z-axis position signal showing a position in which the wear amount has been measured is also supplied to the A-D converter 44 and is also digitized. The digital signals are supplied through the interface 51 to the computer 53 and are operated in the computer. The operation result is recorded in the floppy disc 57 and further displayed in the CRT display 54 and the like.

It is a matter of course that the operation result recorded in the disc 57 can be displayed by using the keyboard 58 later.

Since the shell can be moved within the predetermined stroke while clamping the control rod 1, the stepping motor 121 is operated to rotate the vertically movable screw 123 and shift the movable support plate 81 coupled with the fixed screw 125 and the shell 85 so that the wear amount at an adjacent position can be measured in the same manner as above.

According to the embodiment, since the detection sensor can be moved to vertically adjacent positions while fixedly clamping the rod to be inspected, the profile at the worn portion which extends in a plane can be detected easily.

Second Embodiment

The following describes another embodiment in which the present invention is applied to inspection of the wear of a control rod used in the nuclear reactor.

Since FIG. 1 has been described in the first embodiment, description thereof is omitted.

Figure 5:
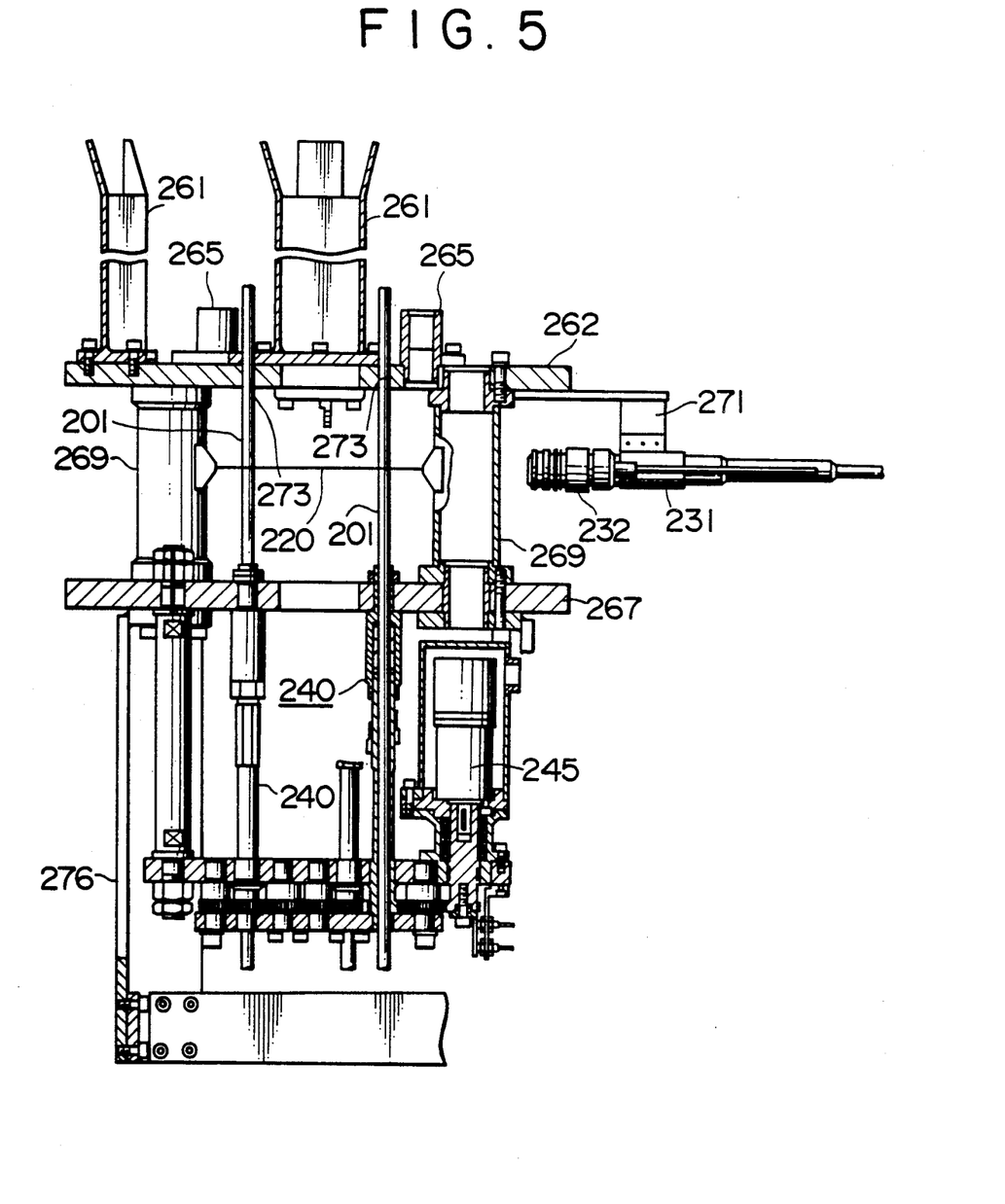
FIG. 5 is a longitudinal sectional view illustrating a main part of the second embodiment.
Figure 6:
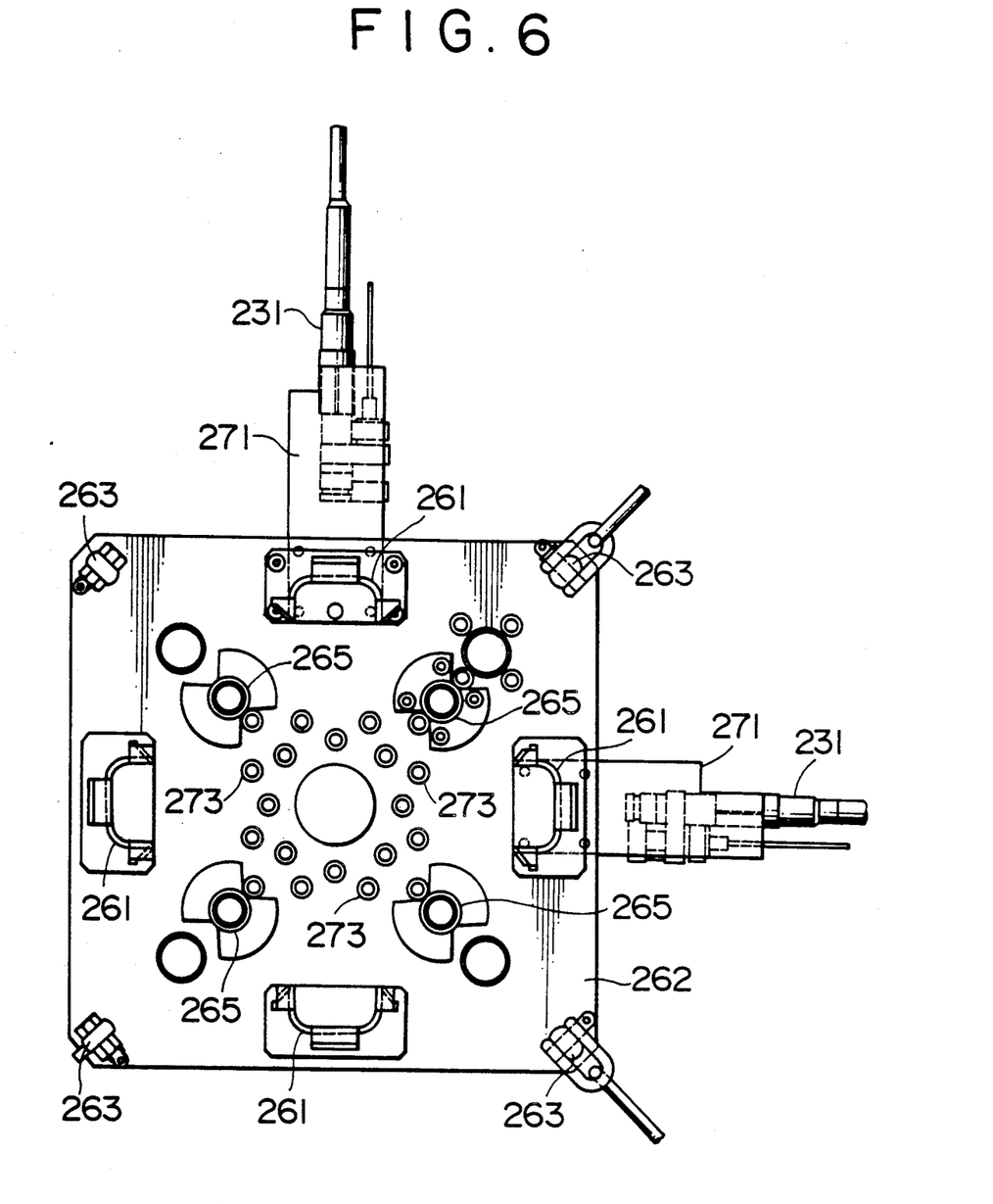
FIG. 6 is a plan view of the main part of the second embodiment.

The structure of the measuring portions of the profile inspection apparatus appears in FIG. 5 (elevational view) and FIG. 6 (plan view).

Lifting eyebolts 263 are mounted in four corners of a lifting plate 262 on which guide frames 261 fixedly stand. The measuring portions are usually set in a pit filled with water and, at this time, lifting wires of a crane are coupled with the eyebolts 263.

The guide frames 261 serves as guide members when the control rods in the form of cluster are set. Guide poles 265 disposed at the periphery of the central portion of the lifting plate 262 set the final positions of the control rods.

A base plate 267 is placed on a stand not shown (which may be a rack in the used nuclear fuel storage pit) and is connected to the lifting plate 262 through supports 269 (disposed at four corners).

Two underwater television cameras 231 mounted to the lifting plate 262 through brackets 271 face a piano wire 220 stretched between the support 269 and can take an image of both the control rods and the piano wire 220 when the control rods in the form of cluster are inserted between the supports 269. An illumination lamp 232 are attached to the side of the camera 231.

Profile detection sensors 240 are provided corresponding to holes 273 (20 holes in this embodiment) formed in the lifting plate 262 and into which control rods 201 are inserted, respectively, and detail thereof is described with reference to FIG. 7. There is provided a stepping motor 245 for rotating the sensors and which is controlled by the controller 41.

Figure 7:
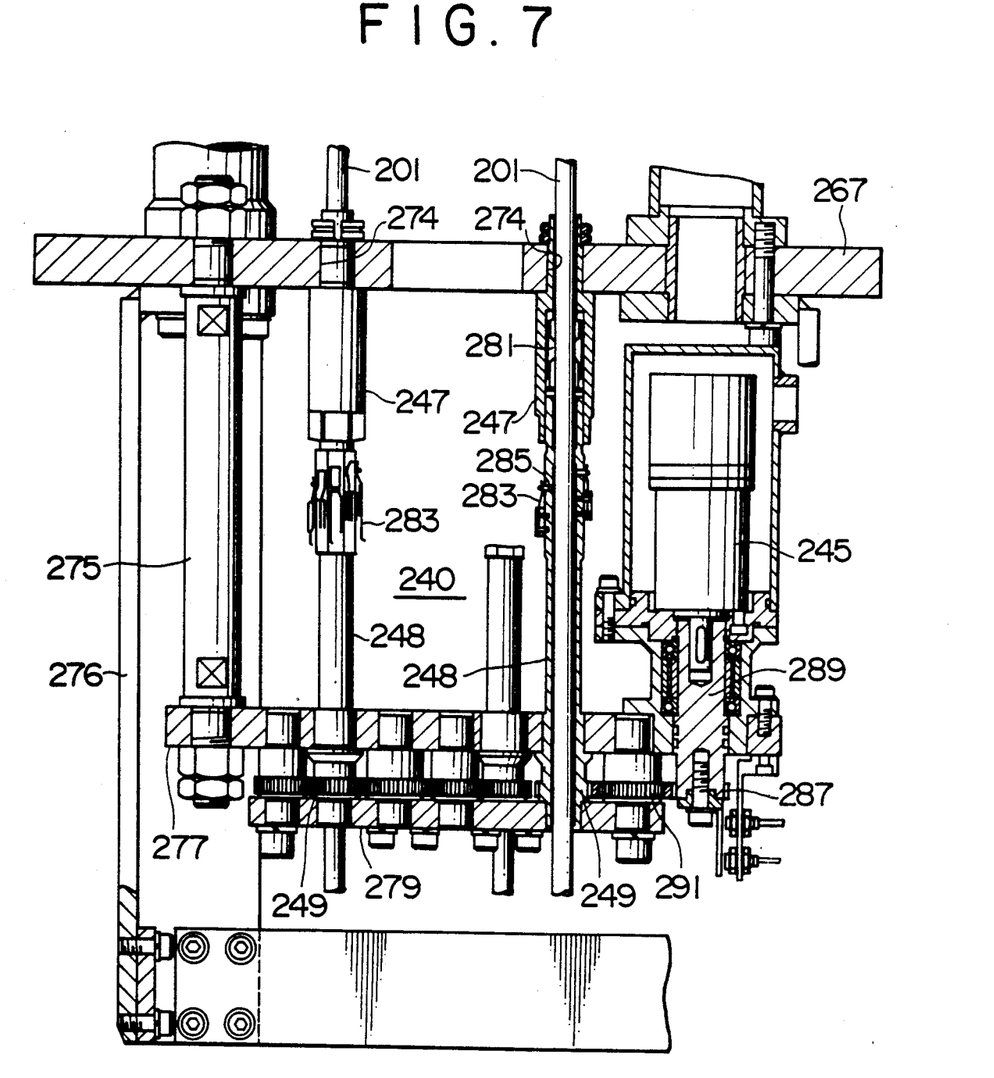
FIG. 7 is a partially enlarged view of FIG. 5.

In FIG. 7, a support plate 277 is mounted under the base plate 267 through support bars 275 in parallel with the base plate 267. A neck of a cylindrical shell holding metal fitting 247 is inserted into a hole 274 (disposed in the same position as the hole 273) of the base plate 267. A base portion of the shell 248 including an upper end which is rotatably inserted into the metal fitting 247 is rotatably supported to support plates 277 and 279. A gear 249 is integrally formed in the base portion of the shell 248.

A collar 281 made of resin is fitted within the holding member 247 to hold the inserted control rod 201 smoothly, flawlessly and concentrically.

The shell 248 is provided eight strain guage type sensors 283 disposed at intervals of equal angle. The sensors resiliently press the outer ends of contact makers 285 provided at intervals of equal angle and equal axial distance. The strain gauge type sensor 283 is of small type and includes a Wheatstone bridge circuit in the body thereof. The sensor detects an amount of deformation in the body of the sensor and converts it to a voltage variation.

An output shaft of the stepping motor 245 is fitted into a drive shaft 289 formed with a gear 287 at an outer periphery of its lower portion. The drive shaft 289 rotates the shell 248 through a gear 291. The plurality of contact makers 285 rotate in the circumferential direction of the control rod 1 in response to the rotation while being in contact with the outer surface of the control rod 201. The strain gauge type sensors 283 produce output signals in accordance with displacement of the contact makers 285, that is, in accordance with unevenness of the external surface of the control rod 1. Only the control rod 1 may be moved down instead of rotation of the shell 248, and when the outputs of the sensors 283 are supplied to the A-D converter 43, variations in the shape of the external appearance (profile) at eight positions of the control rod 1 in the axial direction can be measured.

The structure and function of the embodiment have been individually described and a procedure of inspecting the profile of the control rod 1 is now described in succession using the above apparatus.

A device such as a crane is used to lift the measuring portion through the eyebolts 263 and set it on a predetermined base as described in the first embodiment. Then, the control rod 201 to be inspected is attached to the measuring portion. The tip or the reference position of the control rod 201 is aligned with the piano wire 220 by using the underwater television cameras 231 so that the reference position is set. At this time, a reading of the Z-axis position detector 11 is adjusted to zero.

Since the distance between the contact makers 285 of the profile detection sensor 240 and the piano wire 220 is determined previously (about 230 mm in the embodiment), the control rod 201 is lowered by the distance so that the tip of the control rod 201 can be inspected by the contact makers 285.

When the control rod 201 is lowered as it is, the strain gauge type sensor 283 produce displacement signals expressing the profile in the axial direction at intervals of 45 degrees at the outer periphery of each of the control rods 201. The signals are digitized in the A-D converter 43 and are supplied to the interface 51 together with the Z-axis position signals. The computer 53 performs operational processing on the basis of the digital displacement signals (measured data) and the Z-axis position signals and the results is recorded in the floppy disc 57 and displayed in the CRT display 54 and the like. It is a matter of course that the results recorded in the floppy disc 57 can be displayed at any time by operating the keyboard 58.

The control rod 201 is held to a predetermined height on the basis of the measured result of the above profile in the axial direction or independently and the shell 248 is rotated.

Thus, displacement signals expressing the sectional shape of the control rod 201 in the eight axial positions at intervals of any pitch are produced from the strain gauge type sensors 283 and supplied to the A-D converter 43.

The Z-axis position signals are supplied to the interface 51 during rotation of the shell. The computer 53 calculates displacement of the external surface (variation in the diameter) in accordance with rotary angles and displays figures in the CRT display 54 or XY plotter 56 or prints calculated data in the printer 55.

The A-D converter 43 is connected to 20 sensors 283 in total and can process data from eight locations of the 20 control rods 201 in real time.

While the cluster having the 20 control rods 201 is inspected promptly in the above embodiment, 16 control rods, for example, can be inspected by determining the arrangement of the holes 273 and 274 and the shell 283 to be applicable to several kinds of control rod clusters having different layout patterns of the control rods 201.

We claim:

1. An apparatus for inspecting profiles of at least two rods in a bundle of rods at a time, comprising:
   a plurality of holding means each for concentrically holding a rod to be inspected;

at least two profile detection sensors each for detecting the profile of the rod, said sensors each having a cylindrical shell, a plurality of strain gauge-type sensors and contact makers;

rotation-drive means for rotating said profile detection sensors;

reference position means for defining a reference position of the rod;

position detection means for detecting an inspection position of the rod with respect to said reference position; and means for processing and displaying signals from said profile detection sensors and said position detection means, drive means for sliding each cylindrical shell and each rod lengthwise relative to each other, each cylindrical shell adapted to receive each rod being rotatably supported concentrically relative to said rod when it receives the rod, said strain gauge-type sensors being disposed at equi-angular intervals on the outer surface of said cylindrical shell, and each of said contact makers extending through a hole of said cylindrical shell so as to slide in the circumferential direction and to be held in contact with the external surface of said rod and one of said strain gauge-type sensors.

2. A profile inspection apparatus of a rod according to claim 1, wherein said rotation drive means and said sliding drive means of the profile detection sensor are driven by a command signal of a controller.

3. An apparatus for inspecting profiles of at least two rods in a bundle of rods at at time, comprising:

a plurality of holding means each for concentrically holding a rod to be inspected;

at least two profile detection sensors each for detecting the profile of a rod, said sensor each having a cylindrical shell, a plurality of strain gauge-type sensors and contact makers;

rotation-drive means for rotating said profile detection sensors;

reference position means for defining a reference position of the rod;

position detection means for detecting an inspection position of the rod with respect to said reference position; and means for processing and displaying signals from said profile detection sensors and said position detection means, said cylindrical shell adapted to receive said rod being rotatably supported concentrically relative to said rod when said shell receives the rod, said strain gauge-type sensors being disposed on the outer surface of said cylindrical shell and each of said contact makers being inserted in a hole of said cylindrical shell so as to slide in the circumferential direction and to be held in contact with the external surface of said rod and one said strain gauge-type sensors.

4. A profile inspection apparatus of a rod according to claim 3 wherein said rotation drive means of the profile detection sensor is driven by a command signal of a controller.

* * * * *